US007325446B1

(12) United States Patent
Assaf et al.

(10) Patent No.: US 7,325,446 B1
(45) Date of Patent: Feb. 5, 2008

(54) ROUGH ROAD DETECTION SYSTEM USING NORMALIZATION ANALYSIS

(75) Inventors: Tameem K. Assaf, Milford, MI (US); Sanjeev M. Naik, Troy, MI (US); David S. Mathews, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/428,010

(22) Filed: Jun. 30, 2006

(51) Int. Cl.
*G01M 15/00* (2006.01)

(52) U.S. Cl. ................................... 73/117.3
(58) Field of Classification Search ................. 73/105, 73/116, 117.2, 117.3, 118.1; 701/101, 110, 701/111
See application file for complete search history.

(56) References Cited

U.S. PATENT DOCUMENTS 5,311,773 A * 5/1994 Bradshaw et al. ............ 73/116
5,668,725 A 9/1997 Naik
2006/0288767 A1* 12/2006 Hernandez ................ 73/117.3
2007/0095130 A1* 5/2007 Assaf et al. ................. 73/104

* cited by examiner

*Primary Examiner*—Eric S. McCall

(57) ABSTRACT

A rough road detection system for an engine having a crankshaft includes a control module and a comparison module. The control module receives a crankshaft speed signal and determines a crankshaft rotation time and a crankshaft acceleration and jerk. The crankshaft rotation time is based on said crankshaft speed signal. The crankshaft acceleration and jerk are based on said crankshaft rotation time. The control module detects a crankshaft disturbance based on said crankshaft acceleration and jerk and counts a number of crankshaft disturbances. The comparison module determines a dispersion value and asymmetry value based on the crankshaft disturbances and determined whether rough road conditions exist based on first and second comparisons. The first comparison is between the dispersion value and a first predetermined threshold. The second comparison is between the asymmetry value and a second predetermined threshold.

18 Claims, 4 Drawing Sheets

ROUGH ROAD DETECTION SYSTEM USING NORMALIZATION ANALYSIS

FIELD OF THE INVENTION

The present invention relates to engine systems, and more particularly to a method for distinguishing rough road operation from engine misfires.

BACKGROUND OF THE INVENTION

Vehicles include an internal combustion engine that generates drive torque. More specifically, the engine draws in air and mixes the air with fuel to form a combustion mixture. The combustion mixture is compressed within cylinders and is combusted to drive pistons. The pistons rotatably drive a crankshaft that transfers drive torque to a transmission and wheels. When the engine misfires, the combustion mixture of a cylinder may not combust at all or only partially, and may cause engine vibration and driveline oscillation. A random misfire typically occurs on different cylinders regardless of whether or not they come from consecutive engine cycles.

When a misfire occurs, the speed of the piston can be affected, thereby decreasing and/or increasing engine speed. Rough roads can also cause changes in engine speed that are similar in magnitude to those generated by engine misfire events. Therefore, rough roads may cause engine misfire detection systems to incorrectly detect engine misfire events.

Central limit theory provides that random behavior and/or disturbances typically follow a normal distribution. More specifically, a randomly sampled average of a data set is normal, even if the distribution it is extrapolated from is not. Random engine misfires and/or disturbances caused by rough road scenarios typically follow a normal distribution, but are capable of being distinguished.

SUMMARY OF THE INVENTION

A rough road detection system for an engine having a crankshaft includes a control module and a comparison module. The control module receives a crankshaft speed signal and determines a crankshaft rotation time and a crankshaft acceleration and jerk. The crankshaft rotation time is based on the crankshaft speed signal. The crankshaft acceleration and jerk are based on the crankshaft rotation time. The control module detects a crankshaft disturbance based on the crankshaft acceleration and jerk and counts a number of crankshaft disturbances. The comparison module determines a dispersion value and asymmetry value based on the crankshaft disturbances and determines whether rough road conditions exist based on first and second comparisons. The first comparison is between the dispersion value and a first predetermined threshold. The second comparison is between the asymmetry value and a second predetermined threshold In other features, rough road conditions exist when the dispersion value exceeds the first threshold value and when the asymmetry value is less than the second threshold value.

In other features, the control module categorizes the crankshaft disturbances according to at least one of first, second, third, fourth, fifth, sixth, seventh and eighth predetermined categories. The first, second, third, fourth, fifth, sixth, seventh and eighth predetermined categories are based on a crankshaft acceleration and a crankshaft jerk.

In other features, the crankshaft disturbances are categorized in the first category when the crankshaft acceleration and the crankshaft jerk are positive and the crankshaft acceleration is less than the crankshaft jerk. The crankshaft disturbances are categorized in the second category when the crankshaft acceleration and the crankshaft jerk are positive and the crankshaft acceleration exceeds the crankshaft jerk. The crankshaft disturbances are categorized in the third category when the crankshaft acceleration is positive, the crankshaft jerk is negative and the crankshaft acceleration exceeds the absolute value of the crankshaft jerk. The crankshaft disturbances are categorized in the fourth category when the crankshaft acceleration is positive, the crankshaft jerk is negative and the crankshaft acceleration is less than the absolute value of the crankshaft jerk. The crankshaft disturbances are categorized in the fifth category when the crankshaft acceleration is negative, the crankshaft jerk is negative and the absolute value of the crankshaft acceleration is less than the absolute value of the crankshaft jerk. The crankshaft disturbances are categorized in the sixth category when the crankshaft acceleration is negative, the crankshaft jerk is negative and the absolute value of the crankshaft acceleration exceeds the absolute value of the crankshaft jerk. The crankshaft disturbances are categorized in the seventh category when the crankshaft acceleration is negative, the crankshaft jerk is positive and the absolute value of the crankshaft acceleration exceeds the absolute value of the crankshaft jerk. The crankshaft disturbances are categorized in the eighth category when the crankshaft acceleration is negative, the crankshaft jerk is positive and the absolute value of the crankshaft acceleration is less than the absolute value of the crankshaft jerk.

In other features, a system comprises the rough road detection system and further comprises a cylinder misfire detection system having a misfire detection module that communicates with the control module and the comparison module and that detects a cylinder misfire event based on the crankshaft disturbances. The cylinder misfire module disregards the crankshaft disturbances for a predetermined set of engine cycles when the rough road conditions exist.

In still other features, the rough road detection system includes a filter module that removes transients in the crankshaft rotation time. The filter module removes periodic crank disturbances based on a predetermined approximation calculation. The predetermined approximation calculation is based on a Fourier series.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
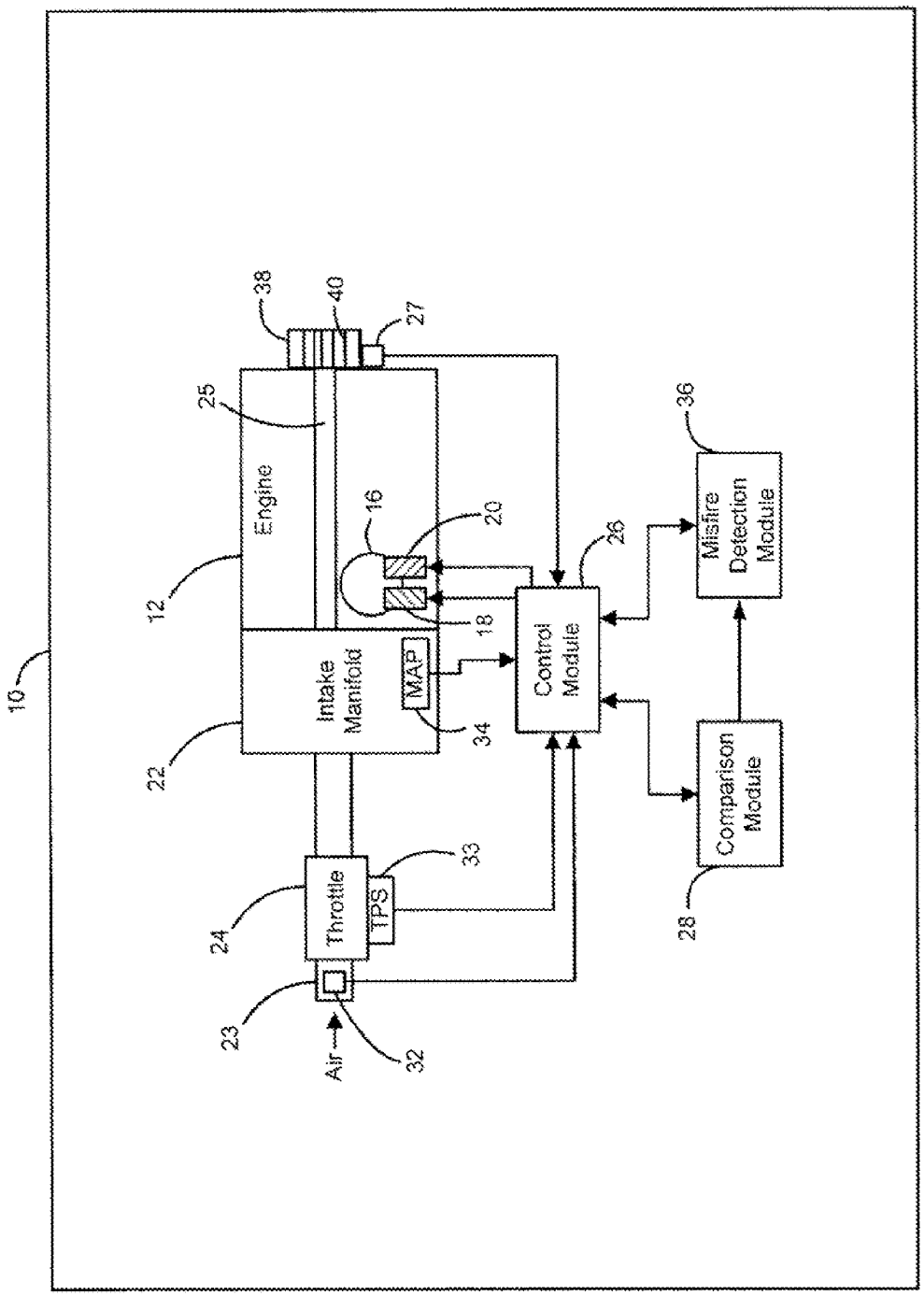
FIG. 1 is a functional block diagram of an exemplary vehicle having a rough road detection system according to the present invention.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 is shown that includes an engine 12 with a cylinder 16 having an associated fuel injector 18 and spark plug 20. Although a single cylinder 16 is shown, the engine 12 can include multiple cylinders 16 with associated fuel injectors 18 and spark plugs 20. For example, the engine 12 may include 1, 2, 3, 4, 5, 6, 8, 10, or 12 cylinders 16. Air is drawn into an intake manifold 22 of the engine 12 through an inlet 23. A throttle 24 regulates the air flow into the intake manifold 22. Fuel and air are combined in the cylinder 16 and are ignited by the spark plug 20. The force from the combustion drives a piston (not shown) that ultimately drives a crankshaft 25. Although the spark plug 20 induces combustion of the air/fuel mixture, the engine 12 can be a compression ignition-type engine wherein combustion of the air/fuel mixture is induced without a spark plug.

The vehicle 10 further includes a control module 26, a crankshaft position sensor 27 and a comparison module 28. The control module 26 receives a crankshaft position signal output by the crankshaft position sensor 27. The comparison module 28 communicates with the control module 26 and determines whether rough road conditions exist, as discussed in greater detail below. The control module 26 also communicates with a mass air flow (MAF) sensor 32, a throttle position sensor (TPS) 33, and a manifold absolute pressure (MAP) sensor 34 that generate MAF, TPS, and MAP signals respectively. The vehicle 10 may also include a misfire detection module 36 that communicates with the control module 26 and the comparison module 28. The misfire detection module 36 can detect engine misfire events based on a set of crankshaft disturbances accumulated over a predetermined number of engine cycles.

The crankshaft position sensor 27 may be responsive to a toothed wheel 38 that rotates with the crankshaft 25. The toothed wheel 38 includes a plurality of equally spaced teeth 40 that extend outward therefrom. At least one tooth 40 can be missing to define a gap (not shown). For example, the toothed wheel 38 can include teeth 40 that are sufficiently sized and spaced to accommodate 60 teeth. However, two teeth are missing for an actual total of 58 teeth disposed about the toothed wheel 38. The missing teeth define the gap. In this example, each tooth 40 corresponds to 6° of rotation of the crankshaft 25 (i.e., 360°/60 teeth). The gap corresponds to a rotational position of the crankshaft 25 relative to a piston position within a cylinder 16. For example, the end of the gap can indicate that a particular piston is at top-dead-center (TDC) within the respected cylinder 16.

A pulse train is generated as the individual teeth rotate past the crankshaft position sensor 27. Each pulse within the pulse train corresponds to a tooth 40 of the toothed wheel 38. For the exemplary toothed wheel 38 described above, each pulse indicates 6° of crankshaft rotation. An engine speed signal (RPM) is determined based on the pulse train. While a particular method is described, skilled artisans will appreciate that other systems and methods for sensing engine speed may be used.

The control module 26 detects one or more crankshaft disturbances based on the crank position signal. Although the crank position signal is used in this example, it should be recognized that any vibration sensitive signal may be used. A crankshaft disturbance can be caused by periodic disturbances and/or random disturbances. Periodic disturbances, such as tooth-to-tooth variations, combustion variations and/or toothed wheel torsionals typically occur on the same cylinder 16 and on consecutive engine cycles. Random disturbances, such as random engine misfires and crankshaft disturbances caused by rough road conditions generally occur on different cylinders 16, regardless of whether or not they come from consecutive engine cycles.

The control module 26 can determine a crankshaft rotation time signal based on the crankshaft position signal. The crankshaft rotation time is the amount of time required for the crankshaft 25 to rotate through a particular angle (e.g., 30°, 60°, 90°, 120°). For example, if an angle of 30° is used, the control module 26 determines the time period over which 5 pulses are received (i.e., 5 pulses×6°/pulse=30°). Thus, the crankshaft rotation time corresponds with an angular velocity of the crankshaft 25. The control module 26 can further filter the crankshaft rotation time signal and reduce the possibility of mistaken rough road detection that may be caused by transients (i.e. rapid accelerations and/or gear shifts) and periodic disturbances. The filtering method can be achieved via Fourier series or another approximation method as discussed in detail in commonly assigned U.S. Pat. No. 5,668,725, issued Sep. 16, 1997, the disclosure of which is expressly incorporated herein by reference in its entirety.

Crankshaft acceleration and/or crankshaft jerk can be calculated based on the crankshaft rotation time signal. Specifically, the control module 26 can calculate first and second derivatives of the crankshaft rotation time with respect to the filtered time. The first derivative (d(t)) indicates crankshaft acceleration. The second derivative (dd(t)) indicates crankshaft jerk. The control module 26 can generate a set of crankshaft disturbance data points ($CRANK_{TOTAL}$) by periodically calculating d(t) and dd(t) for over a predetermined number of engine cycles. Normalization analysis can then be applied to $CRANK_{TOTAL}$ to determine whether rough road conditions exist.

Figure 3:
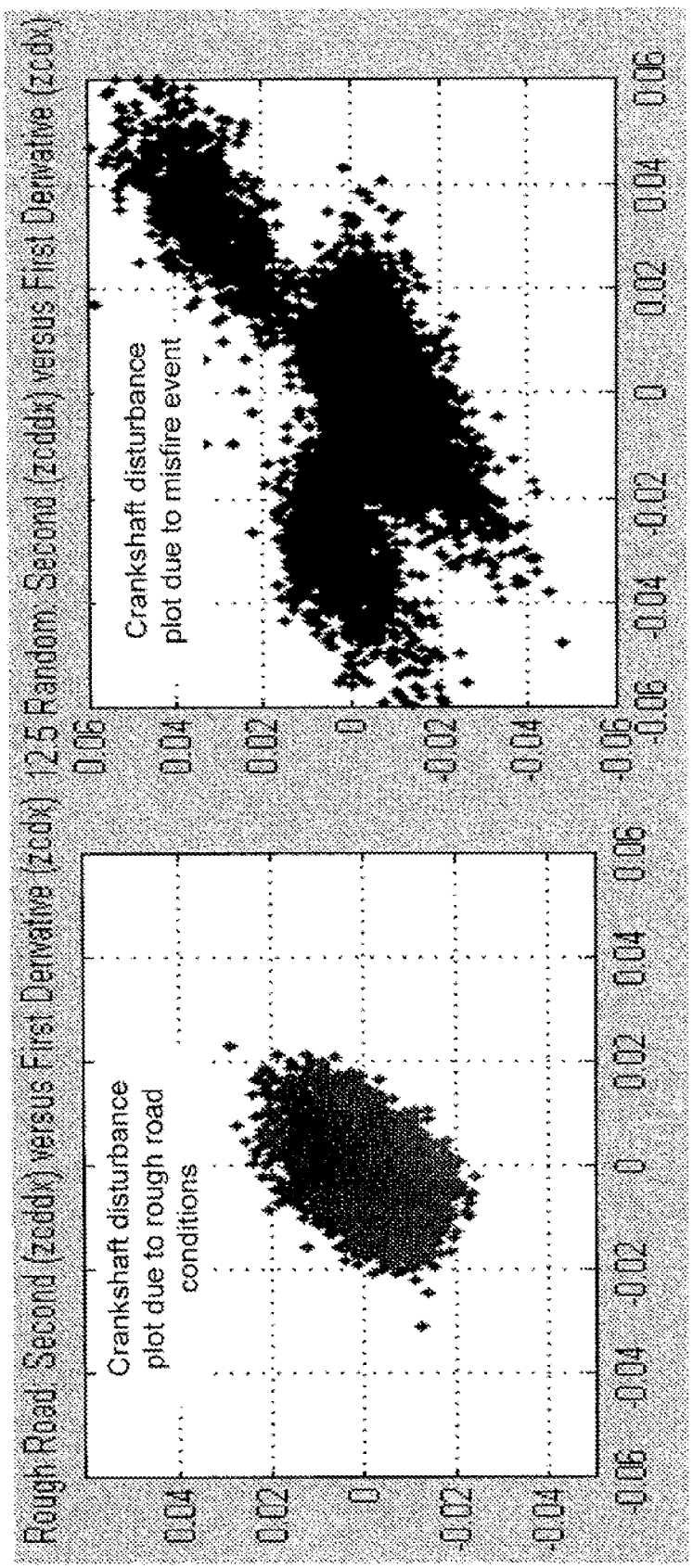
FIGS. 3A and 3B are exemplary plots of crankshaft disturbances caused by rough road conditions and misfire events, respectively.

Specifically, central limit theory provides that a distribution of a randomly sampled average of a data set is normal, even if the distribution it is extrapolated from is not. Accordingly, both random misfires and rough road disturbances can produce a normal distribution of crankshaft disturbances. However, a distribution from a randomly misfiring engine can have predictable components due to the behavior of the cylinders 16 after a misfire event. Rough road conditions generally do not produce those predictable components. A comparison between a misfire distribution and a rough road distribution is illustrated in FIGS. 3A and 3B. Therefore, analyzing a collection of crankshaft disturbances can determine whether rough road conditions exist, as discussed in greater detail below.

Figure 4:
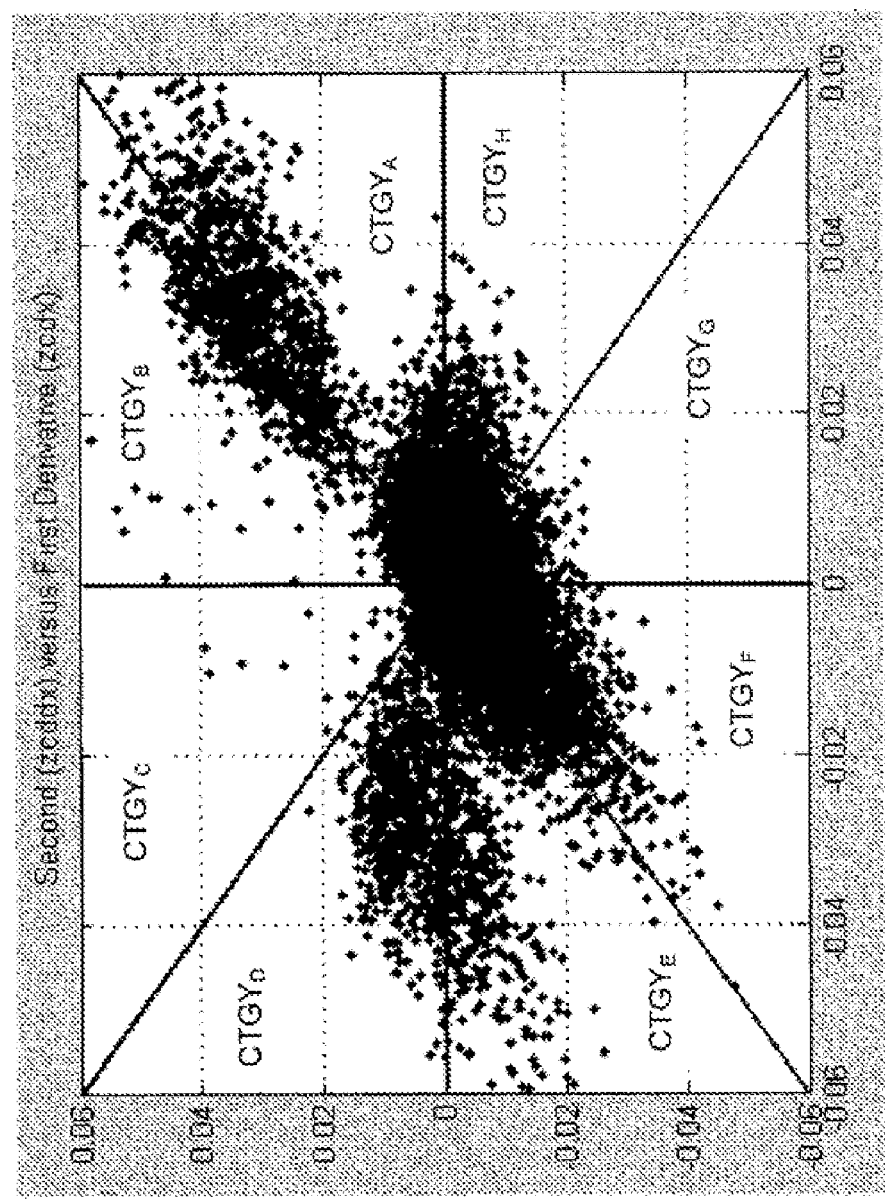
FIG. 4 is an exemplary plot of crankshaft jerk versus crankshaft acceleration.

The control module 26 can categorize the crankshaft disturbances that generate $CRANK_{TOTAL}$ into one or more categories. The categories are pre-programmed in memory and are based on crankshaft acceleration and crankshaft jerk. For example, eight categories may be used to distinguish a plurality of crankshaft disturbances (see FIG. 4). A crankshaft disturbance can be categorized into a first category ($CTGRY_A$) when the value of the crankshaft acceleration is positive, the value of the crankshaft jerk is positive and the value of the crankshaft jerk exceeds the value of the crankshaft acceleration.

A crankshaft disturbance can be categorized into a second category ($CTGRY_B$) when the value of the crankshaft acceleration is positive, the value of the crankshaft jerk is positive and the value of the crankshaft jerk is less than the value of the crankshaft acceleration. A crankshaft disturbance can be categorized into yet a third category ($CTGRY_C$) when the value of the crankshaft acceleration is positive, the value of the crankshaft jerk is negative and the value of the crankshaft acceleration exceeds the absolute value of the crankshaft jerk.

A crankshaft disturbance can be categorized into still a fourth category ($CTGRY_D$) when the value of the crankshaft acceleration is positive, the value of the crankshaft jerk is negative and the absolute value of the crankshaft jerk exceeds the value of the crankshaft acceleration. By performing similar varieties of the comparisons stated above, a crankshaft disturbance can be categorized into one of four remaining categories (i.e. $CTGRY_E$ through $CTGRY_H$). Although the crankshaft disturbances were categorized based on comparisons between the first and second derivatives, another method may be used. In some implementations, the categories ($CTGRY_A$ through $CTGRY_H$) may be rotated clockwise or counterclockwise. For example, the categories may be rotated counterclockwise by 22.5°, thereby centering $CTGRY_A$ on a misfire in the upper right corner of FIG. 4.

The control module 26 can output the categorical data to the comparison module 28 after a predetermined time. The comparison module 28 determines a dispersion value (DISP) based on $CRANK_{TOTAL}$. The dispersion value indicates a degree of concentration amongst the total crankshaft disturbances. The comparison module 28 further calculates an asymmetry value (ASYMM) based on comparisons between the categories. Specifically, the total number in a first predetermined category can be combined with a total number in a second predetermined category to form a larger principle category. The absolute difference is taken between predetermined principle categories to determine a categorical difference. The asymmetry value is determined based on the sum of the categorical differences as stated by the following equation:

$$\text{asymmetry} = \begin{pmatrix} |CTGRY_A - CTGRY_E| + |CTGRY_B - CTGRY_F| + \\ |CTGRY_C - CTGRY_G| + |CTGRY_D - CTGRY_H| \end{pmatrix}$$

The dispersion value along with the asymmetry value can provide a method that can be used to analyze the total number of detected crankshaft disturbances. Rough road conditions can be determined based on a first comparison between the dispersion value and a first predetermined threshold value ($THR_A$) and a second comparison between the asymmetry value and a second predetermined threshold value ($THR_B$). Specifically, the comparison module 28 compares DISP to $THR_A$ and ASYMM to $THR_B$. When DISP exceeds $THR_A$ and ASYMM is less than $THR_B$, the comparison module 28 determines that rough road conditions exist. Subsequently, the comparison module 28 can command the misfire detection module 36 to disregard samples from a pre-selected set of engine cycles. Accordingly, false engine misfire events caused by rough road conditions may be reduced.

Figure 2:
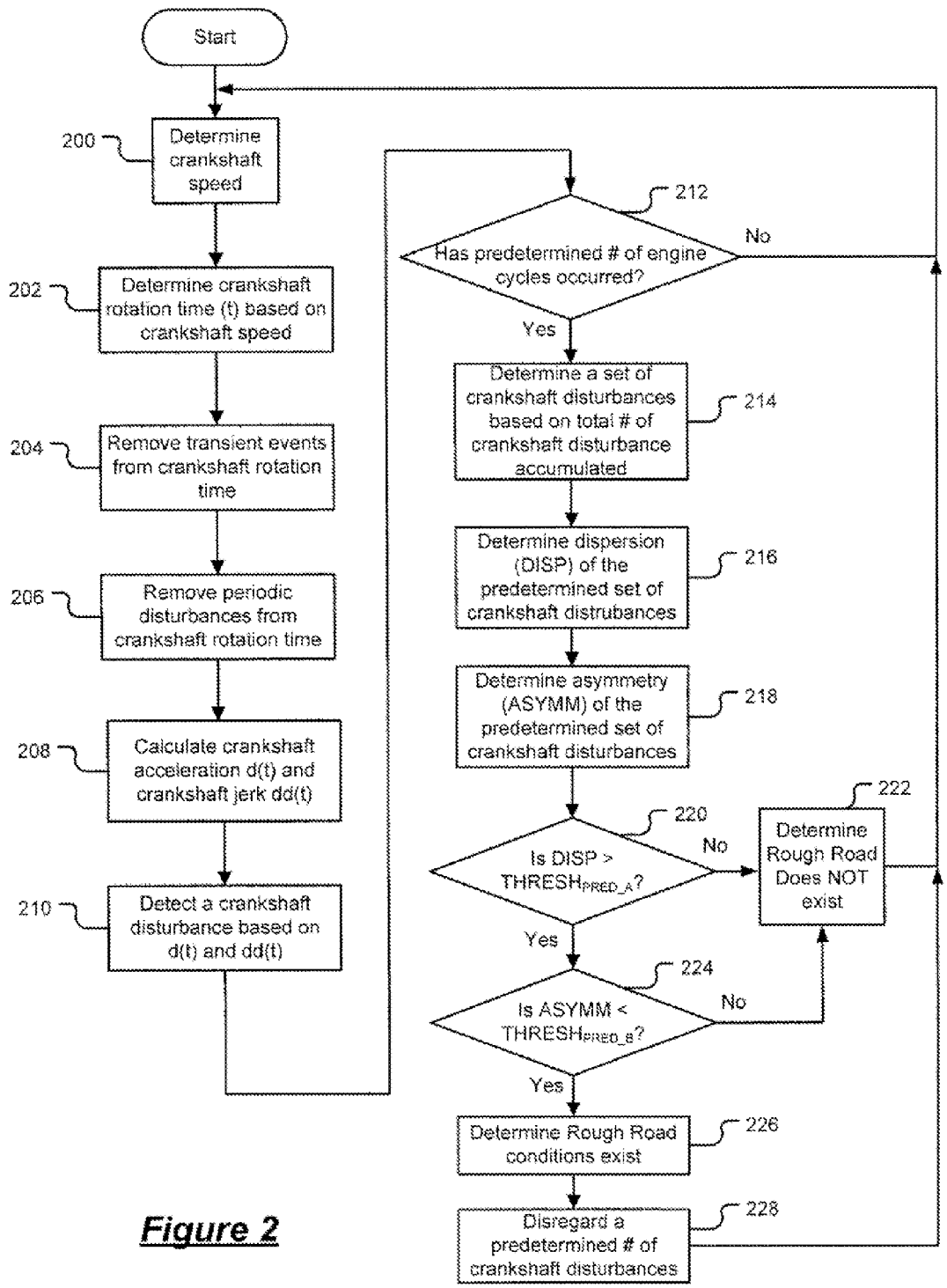
FIG. 2 is a flowchart illustrating exemplary steps performed by the rough road detection system of the present invention.

Referring now to FIG. 2, control determines the crankshaft speed in step 200. In step 202, control determines a crankshaft rotation time (t) based on the crankshaft speed. In step 204, control removes transient events, such as rapid accelerations and gear shifts from the crankshaft rotation time. In step 206, control removes periodic disturbances due to tooth-to-tooth errors, torsional impacts and continuous misfires from the crankshaft rotation time. Control calculates crankshaft acceleration (d(t)) and crankshaft jerk (dd(t)) based on the crankshaft rotation time in step 208.

In step 210, control detects a crankshaft disturbance based on d(t) and dd(t). In step 212, control determines whether an acceptable number of engine cycles have occurred to produce accurate results. When a predetermined number of engine cycles have not occurred, control returns to step 200. Otherwise, control proceeds to step 214. In step 214, control determines $CRANK_{TOTAL}$.

Control determines DISP in step 216 based on $CRANK_{TOTAL}$. Control determines ASYMM in step 218 based on $CRANK_{TOTAL}$. In step 220, control determines whether DISP exceeds $THR_A$. When DISP is below $THR_A$, control determines rough road conditions do not exist in step 222 and control returns to step 200. Otherwise, control determines whether ASYMM is below $THR_B$ in step 224. When ASYMM exceeds $THR_B$, control determines rough road conditions do not exist in step 222 and control returns to step 200. Otherwise, control determines rough road conditions exist in step 226. In step 228, control disregards sampled from a predetermined number of engine cycles and control returns to step 200.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A rough road detection system for an engine having a crankshaft, comprising:
    a control module that receives a crankshaft speed signal, that determines a crankshaft rotation time based on said crankshaft speed signal, that determines a crankshaft acceleration and a crankshaft jerk based on said crankshaft rotation time, that detects a crankshaft disturbance based on said crankshaft acceleration and said crankshaft jerk, and that counts a number of crankshaft disturbances; and
    a comparison module that communicates with said control module, that determines a dispersion value and an asymmetry value based on said crankshaft disturbances, and that determines whether rough road conditions exist based on first and second comparisons,
    wherein said first comparison is between said dispersion value and a first predetermined threshold value, and
    wherein said second comparison is between said asymmetry value and a second predetermined threshold value.

2. The rough road detection system of claim 1 wherein said rough road conditions exist when said dispersion value exceeds said first threshold value and when said asymmetry value is less than said second threshold value.

3. The rough road detection system of claim 1 wherein said control module categorizes said crankshaft disturbances according to at least one of first, second, third, fourth, fifth, sixth, seventh and eighth predetermined categories, wherein said first, second, third, fourth, fifth, sixth, seventh and eighth predetermined categories are based on a crankshaft acceleration and a crankshaft jerk.

4. The rough road detection system of claim 1 wherein:
said crankshaft disturbances are categorized in said first category when said crankshaft acceleration and said crankshaft jerk are positive and said crankshaft acceleration is less than said crankshaft jerk,
said crankshaft disturbances are categorized in said second category when said crankshaft acceleration and said crankshaft jerk are positive and said crankshaft acceleration exceeds said crankshaft jerk,
said crankshaft disturbances are categorized in said third category when said crankshaft acceleration is positive, said crankshaft jerk is negative and said crankshaft acceleration exceeds the absolute value of said crankshaft jerk,
said crankshaft disturbances are categorized in said fourth category when said crankshaft acceleration is positive, said crankshaft jerk is negative and said crankshaft acceleration is less than the absolute value of said crankshaft jerk,
said crankshaft disturbances are categorized in said fifth category when said crankshaft acceleration is negative, said crankshaft jerk is negative and the absolute value of said crankshaft acceleration is less than the absolute value of said crankshaft jerk,
said crankshaft disturbances are categorized in said sixth category when said crankshaft acceleration is negative, said crankshaft jerk is negative and the absolute value of said crankshaft acceleration exceeds the absolute value of said crankshaft jerk,
said crankshaft disturbances are categorized in said seventh category when said crankshaft acceleration is negative, said crankshaft jerk is positive and the absolute value of said crankshaft acceleration exceeds the absolute value of said crankshaft jerk, and
said crankshaft disturbances are categorized in said eighth category when said crankshaft acceleration is negative, said crankshaft jerk is positive and the absolute value of said crankshaft acceleration is less than the absolute value of said crankshaft jerk.

5. A system comprising the rough road detection system of claim 1 and further comprising a cylinder misfire detection system having a misfire detection module that communicates with said control module and said comparison module and that detects a cylinder misfire event based on said crankshaft disturbances.

6. The system of claim 5 wherein said cylinder misfire module disregards said crankshaft disturbances from a predetermined number of engine cycles when said rough road conditions exist.

7. The rough road detection system of claim 1 further comprising a filter module that removes transients in said crankshaft rotation time.

8. The rough road detection system of claim 7 wherein said filter module removes periodic crank disturbances based on a predetermined approximation calculation.

9. The rough road detection system of claim 8 wherein said predetermined approximation calculation is based on a Fourier series.

10. A method for detecting a rough road, comprising:
receiving a crankshaft speed signal;
determining a crankshaft rotation time based on said crankshaft speed signal;
determining a crankshaft acceleration and a crankshaft jerk based on said crankshaft rotation time;
detecting a crankshaft disturbance based on said crankshaft acceleration and said crankshaft jerk;
counting a number of crankshaft disturbances;
determining a dispersion value and a asymmetry value based on said crankshaft disturbances;
determining whether rough road conditions exist based on first and second comparisons, wherein said first comparison is between said dispersion value and a first predetermined threshold value and wherein said second comparison is between said asymmetry value and a second predetermined threshold value; and
categorizing said crankshaft disturbances according to predetermined categories, wherein said predetermined categories are based on a crankshaft acceleration and a crankshaft jerk.

11. The method of claim 10 wherein said rough road conditions exist when said dispersion value exceeds said first threshold value and when said asymmetry value is less than said second threshold value.

12. The method of claim 10 wherein said categorizing said crankshaft disturbances is according to at least one of first, second, third, fourth, fifth, sixth, seventh and eighth predetermined categories, wherein said first, second, third, fourth, fifth, sixth, seventh and eighth predetermined categories are based on said crankshaft acceleration and said crankshaft jerk.

13. The method of claim 10 further comprising:
categorizing said crankshaft disturbances in said first category when said crankshaft acceleration and said crankshaft jerk are positive and said crankshaft acceleration is less than said crankshaft jerk;
categorizing said crankshaft disturbances in said second category when said crankshaft acceleration and said crankshaft jerk are positive and said crankshaft acceleration exceeds said crankshaft jerk;
categorizing said crankshaft disturbances in said third category when said crankshaft acceleration is positive, said crankshaft jerk is negative and said crankshaft acceleration exceeds the absolute value of said crankshaft jerk;
categorizing said crankshaft disturbances in said fourth category when said crankshaft acceleration is positive, said crankshaft jerk is negative and said crankshaft acceleration is less than the absolute value of said crankshaft jerk;
categorizing said crankshaft disturbances in said fifth category when said crankshaft acceleration is negative, said crankshaft jerk is negative and the absolute value of said crankshaft acceleration is less than the absolute value of said crankshaft jerk;
categorizing said crankshaft disturbances in said sixth category when said crankshaft acceleration is negative, said crankshaft jerk is negative and the absolute value of said crankshaft acceleration exceeds the absolute value of said crankshaft jerk;
categorizing said crankshaft disturbances in said seventh category when said crankshaft acceleration is negative, said crankshaft jerk is positive and the absolute value of said crankshaft acceleration exceeds the absolute value of said crankshaft jerk; and
categorizing said crankshaft disturbances in said eighth category when said crankshaft acceleration is negative, said crankshaft jerk is positive and the absolute value of said crankshaft acceleration is less than the absolute value of said crankshaft jerk.

14. The method of claim 10 further comprising detecting a cylinder misfire event based on said crankshaft disturbances.

15. The method of claim 14 further comprising disregarding said crankshaft disturbances for a predetermined set of engine cycles when said rough road conditions exist.

16. The method of claim 10 further comprising removing transients from said crankshaft rotation time.

17. The method of claim 16 further comprising removing periodic crank disturbances based on a predetermined approximation calculation.

18. The method of claim 17 wherein said predetermined calculation is based on a Fourier series.

* * * * *